US012336656B2

(12) United States Patent
Campbell et al.

(10) Patent No.: US 12,336,656 B2
(45) Date of Patent: Jun. 24, 2025

(54) FOOD PRODUCT DISPENSER WITH TEMPERATURE CONTROL (71) Applicant: Rich Products Corporation, Buffalo, NY (US)

(72) Inventors: Shawn Campbell, Burlington (CA); Ralf Reiser, Orchard Park, NY (US); Seung-Yeol Hong, Amherst, NY (US); Michael Paul Piatko, West Seneca, NY (US)

(73) Assignee: Rich Products Corporation, Buffalo, NY (US)

( * ) Notice: Subject to any disclaimer, the term of this patent is extended or adjusted under 35 U.S.C. 154(b) by 811 days.

(21) Appl. No.: 17/285,047

(22) PCT Filed: Oct. 15, 2019

(86) PCT No.: PCT/US2019/056295
§ 371 (c)(1),
(2) Date: Apr. 13, 2021

(87) PCT Pub. No.: WO2020/081545
PCT Pub. Date: Apr. 23, 2020

(65) Prior Publication Data
US 2022/0022684 A1 Jan. 27, 2022

Related U.S. Application Data (60) Provisional application No. 62/745,851, filed on Oct. 15, 2018.

(51) Int. Cl.
A47J 31/50 (2006.01)
A47J 31/40 (2006.01)
(Continued)

(52) U.S. Cl.
CPC ........... *A47J 31/505* (2013.01); *A47J 31/407* (2013.01); *A47J 31/4485* (2013.01); *A47J 31/468* (2018.08)

(58) Field of Classification Search
CPC ...... A47J 31/505; A47J 31/468; A47J 31/407; A47J 31/4485
(Continued)

(56) References Cited

U.S. PATENT DOCUMENTS

D185,626 S 7/1959 Craig et al.
D196,874 S 11/1963 Fites
(Continued)

FOREIGN PATENT DOCUMENTS

CN 1636124 A 7/2005
CN 103249666 A 8/2013
(Continued)

OTHER PUBLICATIONS

Korean Patent Office Action for application 10-2020-7025591, mailed on Dec. 27, 2022 (6 pages with translation).
(Continued)

*Primary Examiner* — Eric S Stapleton
*Assistant Examiner* — Yeong Juen Thong
(74) *Attorney, Agent, or Firm* — Michael Best & Friedrich LLP (57) ABSTRACT A dispenser configured to dispense a product from a product package includes an inlet configured to receive the product from the product package, a dispensing nozzle downstream of the inlet, a pump in fluid communication with the inlet and operable to pump the product from the product package to the dispensing nozzle, and a temperature control assembly including a temperature control element in thermally con-
(Continued)

ductive contact with the product package and the dispensing nozzle to heat or cool the product package and the dispensing nozzle.

17 Claims, 8 Drawing Sheets

(51) Int. Cl.
  *A47J 31/44* (2006.01)
  *A47J 31/46* (2006.01)
(58) Field of Classification Search
  USPC .................................................. 99/295, 300
  See application file for complete search history.

(56) References Cited

U.S. PATENT DOCUMENTS

| | | | |
|---|---|---|---|
| 3,559,958 | A | 2/1971 | Carpigiani |
| 3,628,893 | A | 12/1971 | Carpigiani |
| 3,632,021 | A | 1/1972 | Macmanus |
| 3,659,519 | A | 5/1972 | Macmanus |
| 3,700,214 | A | 10/1972 | Macmanus |
| 3,764,238 | A | 10/1973 | Carpigiani |
| 3,815,789 | A | 6/1974 | Carpigiani |
| 3,854,700 | A | 12/1974 | Macmanus |
| 4,061,248 | A | 12/1977 | Arena |
| 4,144,293 | A | 3/1979 | Hamoto et al. |
| 4,168,727 | A | 9/1979 | Yoshida |
| 4,173,126 | A | 11/1979 | Romano |
| D253,987 | S | 1/1980 | Painter |
| 4,398,830 | A | 8/1983 | Koerfer |
| 4,484,597 | A | 11/1984 | Bravo |
| 4,668,098 | A | 5/1987 | Bravo |
| 4,766,739 | A | 8/1988 | Cimenti |
| 4,816,190 | A | 3/1989 | Kirchler |
| 4,884,721 | A | 12/1989 | Kirchler |
| 4,993,599 | A | 2/1991 | Gruenewald |
| 5,089,178 | A | 2/1992 | Passoni |
| D328,220 | S | 7/1992 | Barnard et al. |
| 5,249,706 | A | 10/1993 | Szabo |
| D375,431 | S | 11/1996 | Credle, Jr. et al. |
| 6,099,878 | A | 8/2000 | Arksey |
| 6,814,262 | B1 | 11/2004 | Adams et al. |
| D531,457 | S | 11/2006 | Gold et al. |
| D616,707 | S | 6/2010 | Gold et al. |
| 8,002,148 | B2 * | 8/2011 | Pakkert ................. B67D 1/0412 222/394 |
| D684,013 | S | 6/2013 | Vance |
| 8,881,948 | B1 | 11/2014 | Lassota |
| 9,044,116 | B2 | 6/2015 | Gavillet et al. |
| D792,164 | S | 7/2017 | Mitchell et al. |
| 9,821,950 | B2 | 11/2017 | Talon |
| 9,878,892 | B2 | 1/2018 | Jersey |
| 9,897,081 | B2 | 2/2018 | Grenon et al. |
| D820,643 | S | 6/2018 | Mitchell et al. |
| 10,194,763 | B2 | 2/2019 | Sowieja et al. |
| D872,513 | S | 1/2020 | Kaplan et al. |
| D899,195 | S | 10/2020 | Reiser et al. |
| 11,772,952 | B2 * | 10/2023 | Dahan ................... E03C 1/0411 99/323.2 |
| 2002/0175181 | A1 | 11/2002 | Schroeder et al. |
| 2004/0241297 | A1 | 12/2004 | Fricker |
| 2009/0301317 | A1 | 12/2009 | Andrews |
| 2010/0104705 | A1 * | 4/2010 | Gordon ..................... A23L 2/50 426/322 |
| 2010/0143161 | A1 * | 6/2010 | Hogan ...................... F04B 7/06 417/500 |
| 2012/0269945 | A1 | 10/2012 | Wijnen et al. |
| 2015/0289710 | A1 | 10/2015 | van Druten et al. |
| 2016/0051079 | A1 | 2/2016 | Abegglen et al. |
| 2017/0291808 | A1 * | 10/2017 | Young .................. B67D 1/0004 |
| 2017/0360061 | A1 | 12/2017 | Fonte |
| 2018/0110360 | A1 | 4/2018 | Chowdhury |
| 2022/0022684 | A1 | 1/2022 | Campbell et al. |

FOREIGN PATENT DOCUMENTS

| | | |
|---|---|---|
| CN | 103917141 A | 7/2014 |
| CN | 203768345 U | 8/2014 |
| CN | 107787196 A | 3/2018 |
| CN | 109311654 A | 2/2019 |
| EP | 0346590 A1 | 12/1989 |
| EP | 0464341 A1 | 1/1992 |
| EP | 0485350 A1 | 5/1992 |
| EP | 0583506 B1 | 1/1997 |
| EP | 1086643 B1 | 11/2002 |
| EP | 1867259 A1 | 12/2007 |
| EP | 1520630 B1 | 8/2009 |
| EP | 2526841 A1 | 11/2012 |
| EP | 2268173 A1 | 12/2013 |
| GB | 2216818 B | 12/1991 |
| IT | 1249215 B1 | 2/1995 |
| IT | 1249216 B1 | 2/1995 |
| JP | H06115593 A | 4/1994 |
| JP | 2008056325 A | 3/2008 |
| KR | 101779366 B1 | 9/2017 |
| WO | 03029731 A2 | 4/2003 |
| WO | WO2014/069994 A1 | 5/2014 |
| WO | WO2014/147256 A1 | 9/2014 |
| WO | WO2017/220436 A1 | 12/2017 |

OTHER PUBLICATIONS

Chinese Patent Office Action for Application No. 201980078055.5 dated Mar. 5, 2024 (79 pages with English machine translation).
Chinese Patent office Second Office action for the Application No. 2019800780555 dated May 24, 2023 (26 pages).
International Search Report with Written Opinion for related Application No. PCT/US2019/056295 dated Jan. 31, 2020 (13 Pages).
Office Action issued from the Chinese Patent Office for related Application No. 2019800780555 dated Aug. 10, 2022 (12 Pages including English Translation).
Notice of Submission of Opinion from the Korean Patent Office for related Application No. 10-2020-7025591 dated Apr. 27, 2022 (13 Pages including English Translation).
Chinese Patent Office Third Action for Application No. 2019800780555 dated Oct. 13, 2023 (25 pages including English translation).
Canadian Patent Office Action for Application No. 3116689 dated Apr. 11, 2024 (4 pages).
Chinese Patent Office Action for Application No. 201980078055.5 dated Sep. 26, 2024 (90 pages including English machine translation).
Chinese Patent Office Action for Application No. 201980078055.5 dated Dec. 31, 2024 (70 pages including English machine translation).

* cited by examiner

FOOD PRODUCT DISPENSER WITH TEMPERATURE CONTROL

CROSS-REFERENCE TO RELATED APPLICATIONS

This application claims priority to co-pending U.S. Provisional Patent Application No. 62/745,851 filed on Oct. 15, 2018, the entire content of which is incorporated herein by reference.

BACKGROUND OF THE DISCLOSURE

The present disclosure relates to product dispensers, and more particularly to temperature controlled product dispensing machines for dispensing consumable food or beverage products, such as whipped topping.

Conventional whipped topping dispensing machines typically include a container, tank, or other reservoir for storing a bulk quantity of product to be dispensed. Thoroughly cleaning and refilling the reservoir can be difficult and time consuming. In addition, to keep the product in the reservoir cool, conventional whipped topping dispensing machines typically employ compression refrigeration systems which are often complex, relatively expensive to produce, and require periodic maintenance.

SUMMARY OF THE DISCLOSURE

The present disclosure provides, in one aspect, a dispenser configured to dispense a product from a product package. The dispenser includes an inlet configured to receive the product from the product package, a dispensing nozzle downstream of the inlet, a pump in fluid communication with the inlet and operable to pump the product from the product package to the dispensing nozzle, and a temperature control assembly including a temperature control element in thermally conductive contact with the product package and the dispensing nozzle to heat or cool the product package and the dispensing nozzle.

The present disclosure provides, in another aspect, a dispenser configured to dispense a product from a product package. The dispenser includes a housing including a first compartment configured to receive the product package and a second compartment separated from the first compartment, a motor positioned in the second compartment, the motor including an output shaft defining an axis, an inlet configured to receive the product from the product package, a dispensing nozzle downstream of the inlet, a pump positioned in the first compartment, the pump in fluid communication with the inlet and driven by the output shaft to pump the product from the product package to the dispensing nozzle, and a temperature control assembly configured to heat or cool the product package when the product package is received in the first compartment.

The present disclosure provides, in another aspect, a method of disassembling a dispenser including a first compartment configured to receive a product package and a pump configured to pump product from the product package, through an aerator, and to a dispensing nozzle. The method includes opening a lid to access the first compartment, detaching the dispensing nozzle from the aerator, disengaging a retainer from the pump, and removing the pump and the aerator from the first compartment.

The present disclosure provides, in another aspect, a dispenser configured to dispense a product from a product package, the dispenser including an inlet configured to receive the product from the product package, a dispensing nozzle downstream of the inlet, a pump in fluid communication with the inlet and operable to pump the product from the product package to the dispensing nozzle through a fluid flow path, and a temperature control assembly including a first zone configured to heat or cool the fluid flow path and a second zone configured to heat or cool the product package. The second zone has a greater heating or cooling capacity than the first zone.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
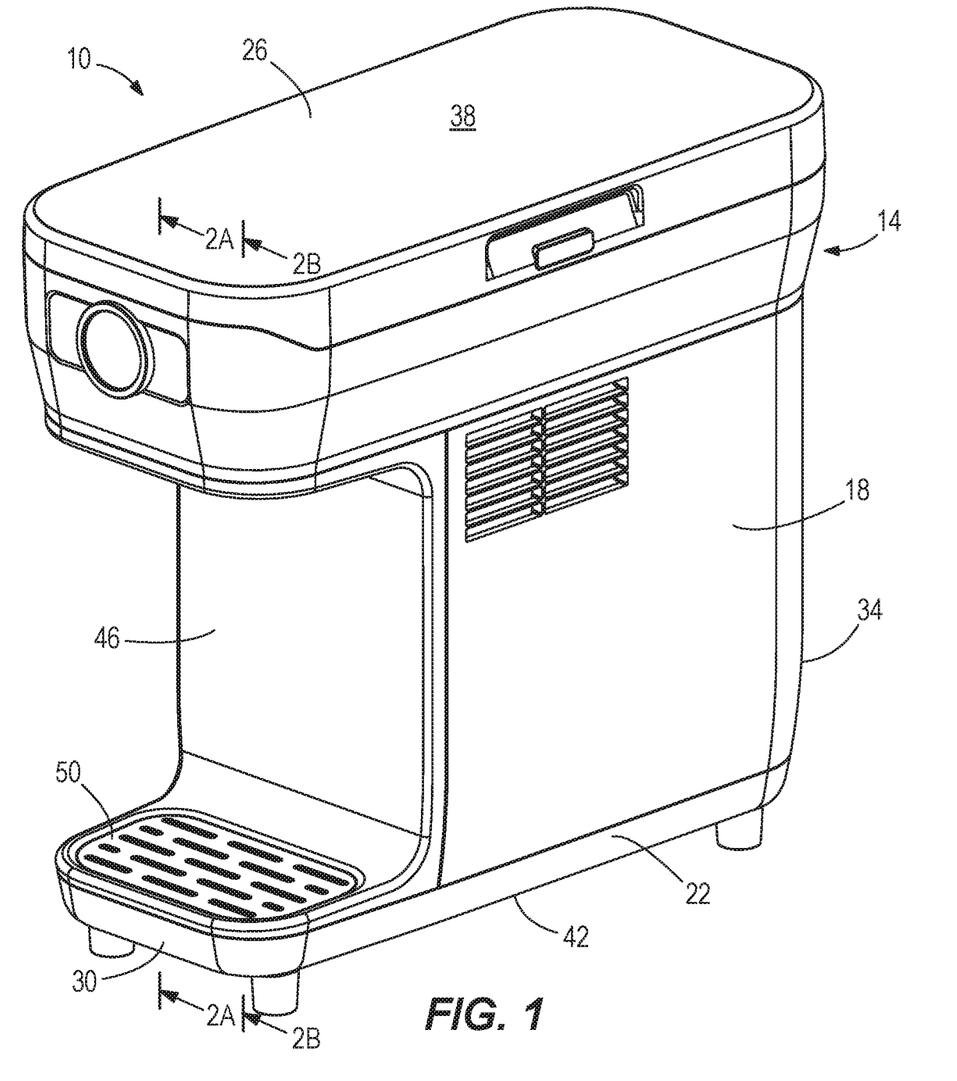
FIG. 1 is a perspective view of a dispenser according to one embodiment of the present disclosure.

FIG. 1 illustrates a dispenser 10 according to one embodiment of the present disclosure. The illustrated dispenser 10 is a tabletop dispenser and includes a housing 14 having a main body 18, a base 22 configured to be set upon a table or other support surface, and a lid 26 coupled to the main body 18. In various embodiments, the dispenser 10 may be free-standing or can be integrated into or otherwise mounted within another structure such as a cabinet, housing, and the like. The illustrated housing 14 includes a front side 30, a rear side 34, and top and bottom sides 38, 42 extending between the front and rear sides 30, 34. Directional terms such as front, rear, etc. are used herein with reference to the orientation of the dispenser 10 illustrated in FIG. 1, but it should be understood that the dispenser 10 may be positioned in other orientations and such terms should not be regarded as limiting.

Figure 2A:
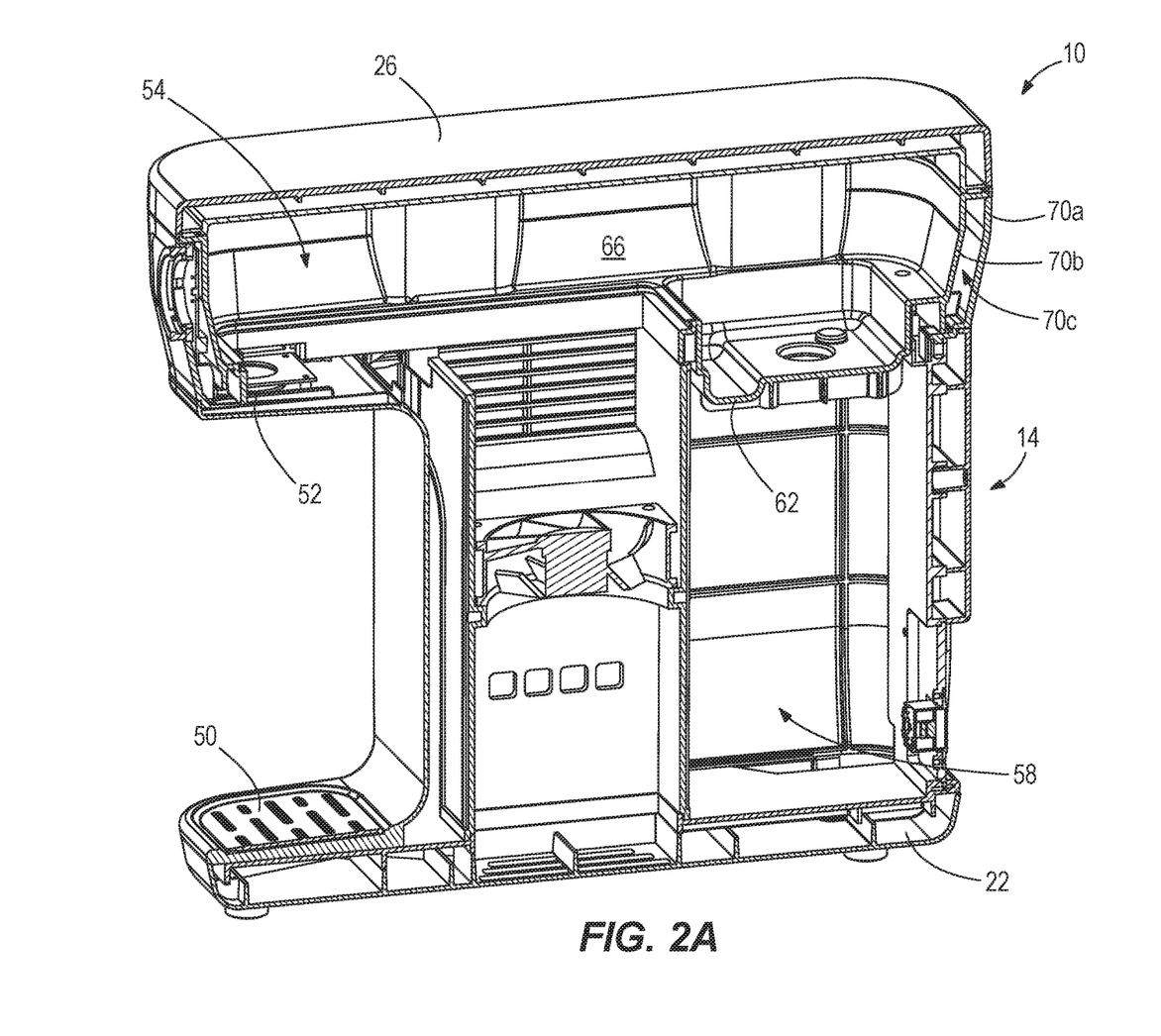
FIG. 2A is a cross-sectional view of the dispenser of FIG. 1, taken along line 2A-2A, with internal components omitted.

The illustrated dispenser 10 includes a recess 46 formed in the front side 30 to provide a platform 50 on the base 22. Referring to FIG. 2A, the housing 14 includes a dispensing opening 52 that overlies the platform 50. A cup or other receptacle to receive product from the dispenser (through the dispensing opening) can be positioned on the platform 50. The platform 50 may include a drip tray with one or more removable components to facilitate cleaning.

With continued reference to FIG. 2A, the illustrated housing 14 includes an upper compartment 54 and a lower compartment 58. The compartments 54, 58 can be at least partially separated by one or more walls or other structures, or can be open to one another. The lid 26, which is movably coupled to the main body 18 for movement between an open position (e.g., FIG. 3) and a closed position (e.g., FIGS. 1 and 2A), provides access into the upper compartment 54 when in the open position. A wall 62 at least partially separates the upper and lower compartments 54, 58 in the illustrated embodiment. A side wall 66 extends around the periphery of the upper compartment 54. In the illustrated embodiment, the lid 26 and the side wall 66 each have a multi-layer construction, including first and second shell layers 70a, 70b and a space 70c defined between the shell layers 70a, 70b. The multi-layer construction of the side wall 66 and the lid 26 may insulate the upper compartment 54 from the ambient conditions surrounding the dispenser 10. In some embodiments, the space 70c may be filled with an insulating material (e.g., polyurethane foam or any other suitable insulating material).

Figure 4:
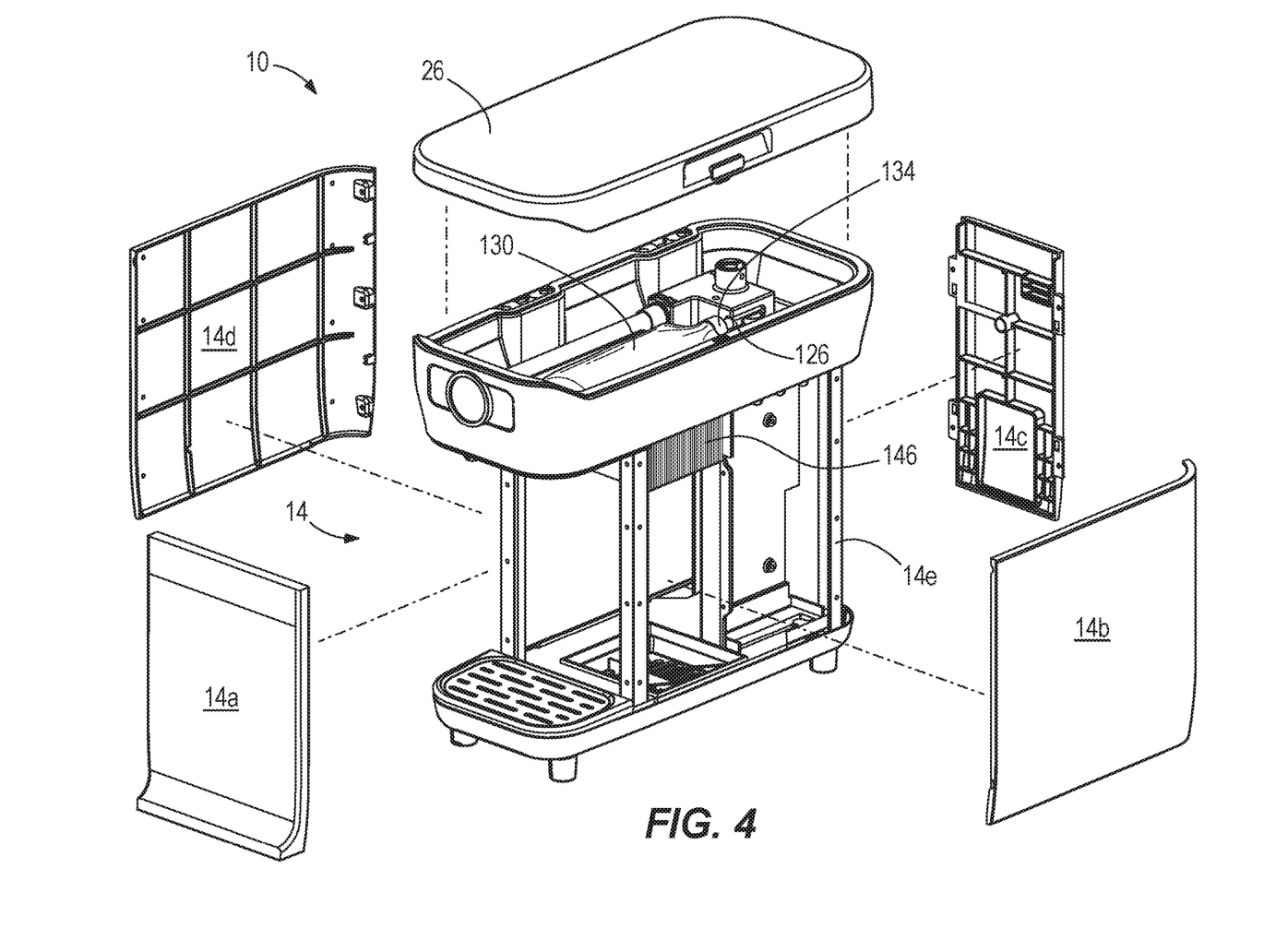
FIG. 4 is another exploded perspective view of the dispenser of FIG. 1.
Figure 5:
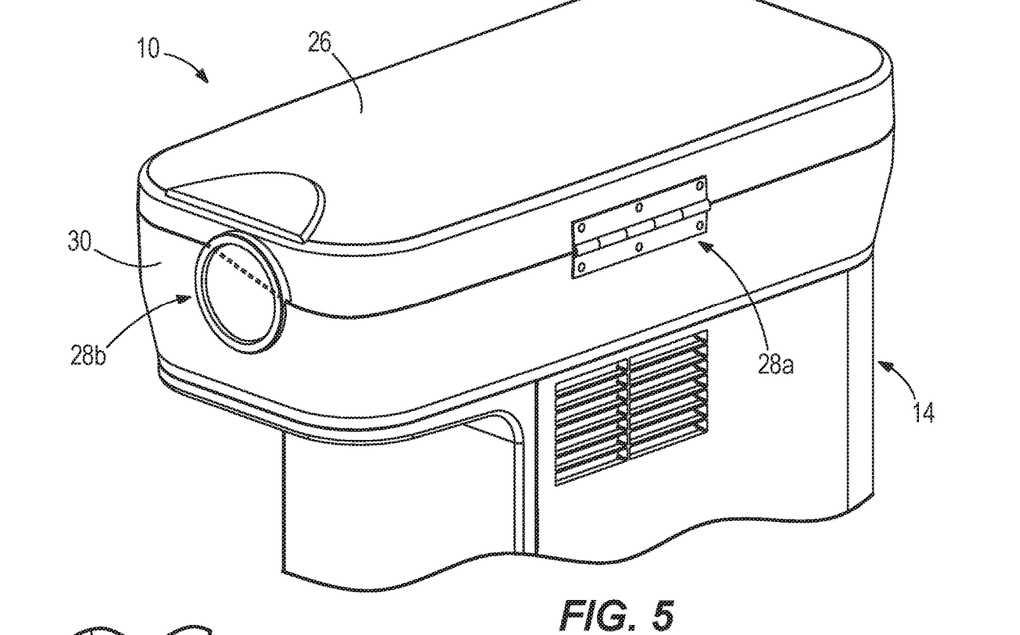
FIG. 5 is a perspective view of the dispenser of FIG. 1, illustrating an embodiment of a lid assembly of the dispenser.
Figure 6:
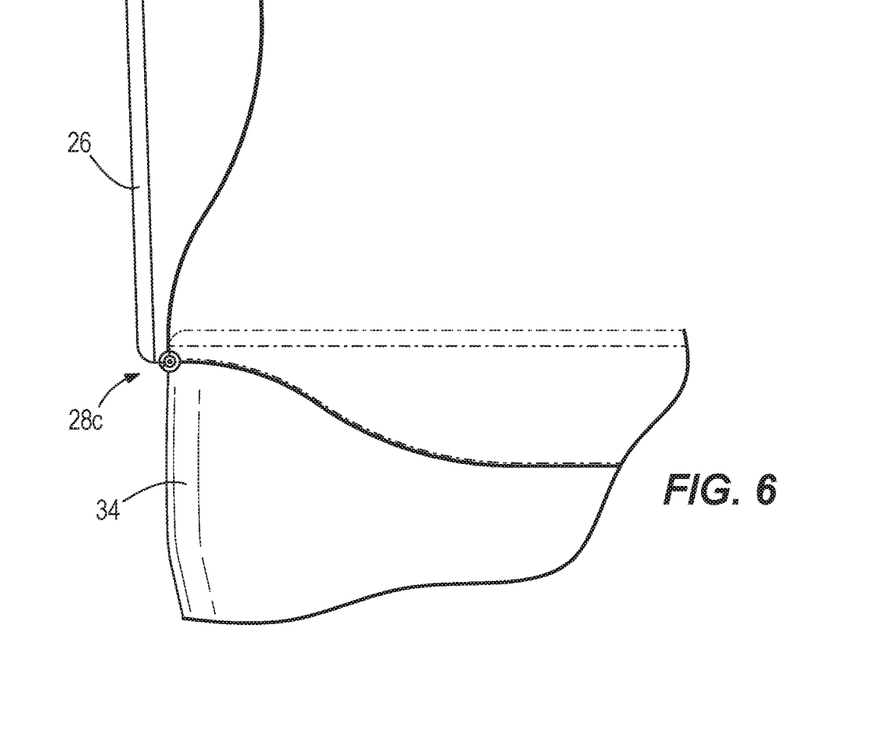
FIG. 6 is a cross-sectional view illustrating a portion of a lid assembly according to another embodiment and usable with the dispenser of FIG. 1.

Referring to FIGS. 4-8, the housing 14 and the lid 26 can be configured in a variety of different ways. For example, in some embodiments, the housing 14 may include a plurality of panels 14a, 14b, 14c, 14d coupled to a frame 14e (FIG. 4). In some embodiments, one or more of the panels 14a-d may be removably coupled to the frame 14e to facilitate access to the lower compartment 58 and components therein for service, maintenance, or other purposes.

Figure 7:
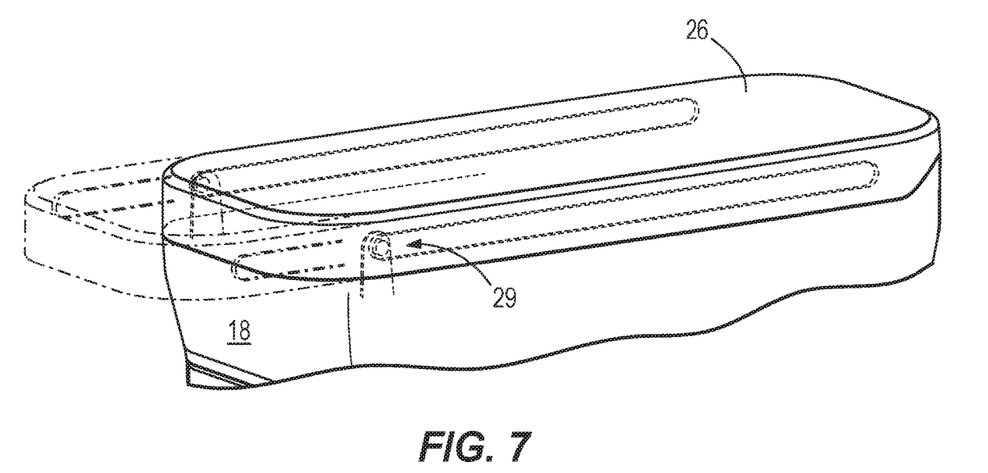
FIG. 7 is a perspective view illustrating a portion of a lid assembly according to another embodiment and usable with the dispenser of FIG. 1.
Figure 8:
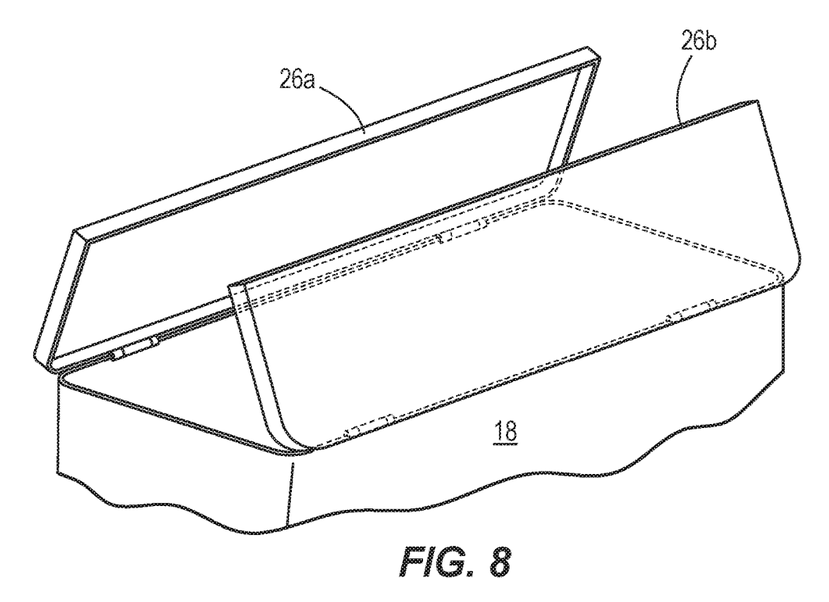
FIG. 8 is a perspective view illustrating a portion of a lid assembly according to another embodiment and usable with the dispenser of FIG. 1.

In various embodiments, the lid 26 may be pivotally coupled to the main body 18 of the housing 14 by a hinge 28a located along a lateral side of the housing 14 (FIG. 5), a hinge 28c located at the front side 30 of the housing 14 (FIG. 5), or a similar hinge located at the rear side 34 of the housing 14 (not shown). In yet other embodiments, the lid 26 may be coupled to the main body 18 by a rolling or sliding hinge 29 (FIG. 7). In such embodiments the lid 26 may be rotatably coupled to the main body 18 and/or slide with respect to the main body 18 between opened and closed positions of the lid 26. In other embodiments, the lid 26 may include two pieces or doors 26a, 26b, each pivotally coupled to the main body 18 (FIG. 8).

Figure 3:
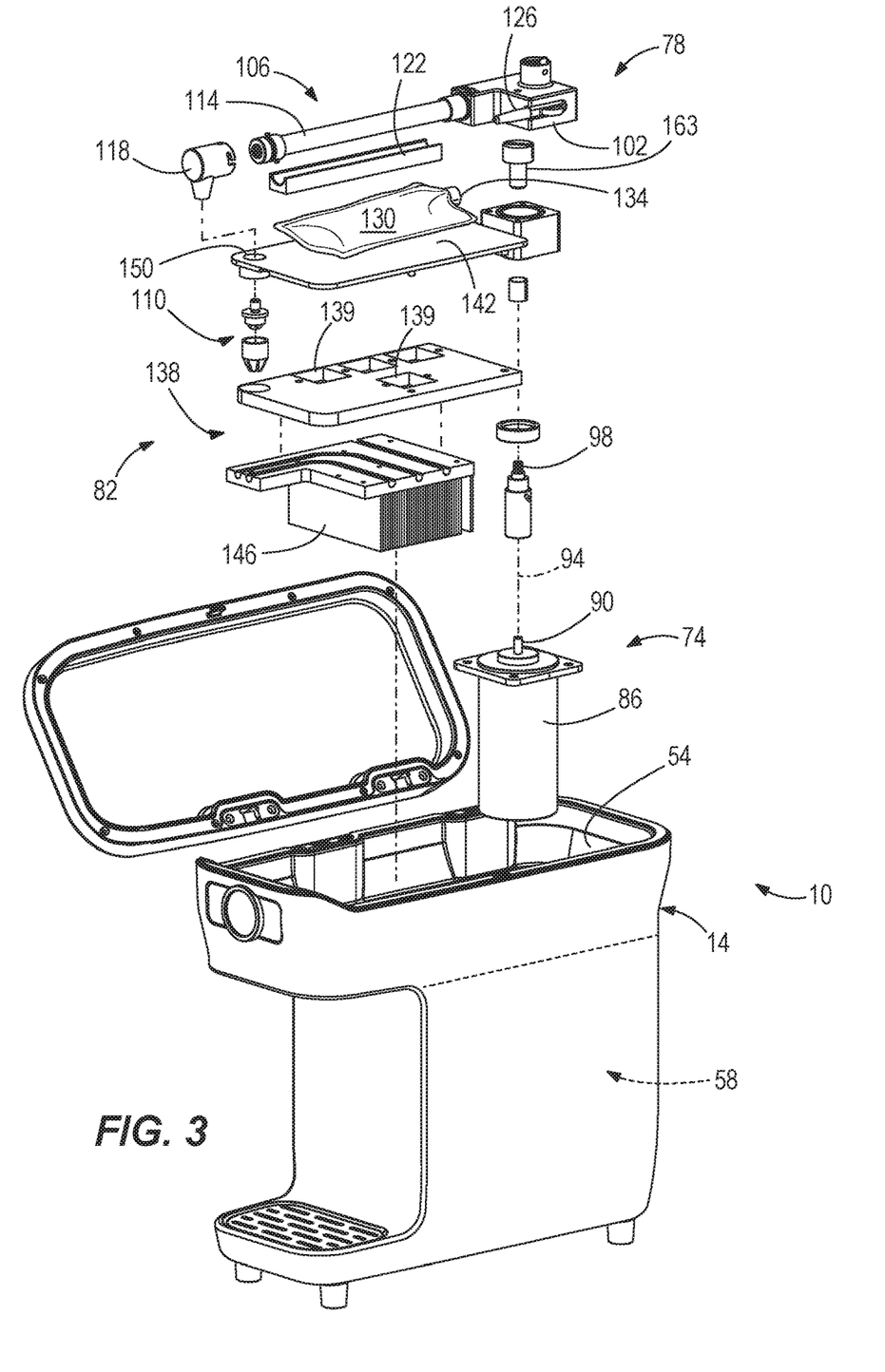
FIG. 3 is an exploded perspective view of the dispenser of FIG. 1.

With reference now to the illustrated embodiment of FIG. 3, the dispenser 10 includes a drive assembly 74, a fluid transfer assembly 78, and a temperature control assembly 82. The illustrated drive assembly 74 includes an electric motor 86 (e.g., a brushed or brushless DC motor or an AC induction motor) having a motor shaft or rotor 90 and a drive shaft 98 coupled to the motor shaft 90. The motor shaft 90 and the drive shaft 98 define an output shaft of the motor 86 that is rotatable about a rotational axis 94. In some embodiments, the motor shaft 90 and the drive shaft 98 may be integrally formed together as a single shaft.

The motor 86 is preferably housed within the lower compartment 58 and therefore separated from the insulated upper compartment 54. In the illustrated embodiment, the motor 86 is oriented vertically. That is, the rotational axis 94 extends generally transverse to the top and bottom sides 38, 42 (FIG. 1) of the housing 14. The illustrated drive shaft 98 is coaxial with the motor shaft 90, and co-rotates with the motor shaft 90 about the axis 94. In other embodiments, however, a transmission, gear reduction, belt, or the like may be disposed between the motor shaft 90 and the drive shaft 98. In addition, the drive assembly 74 may include one or more intermediate shafts disposed between the motor shaft 90 and the drive shaft 98, and the orientations of the motor shaft 90 and the drive shaft 98 may vary. By way of example only, in other embodiments the motor 86 and the motor shaft 90 are oriented horizontally, and are still mechanically connected to the fluid transfer assembly with suitable mechanical power transmission components such as a gearbox, belts or chains, and the like.

With continued reference to FIG. 3, the illustrated fluid transfer assembly 78 includes a pump 102 drivably coupled to the drive shaft 98 (e.g., via an input shaft 163 of the pump 102), an aerator 106 coupled to an outlet of the pump 102, and a dispensing nozzle 110 disposed downstream of the aerator 106. The pump 102 may be a gear pump or any other relatively compact liquid pump. In the illustrated embodiment, the pump 102 is coupled to the housing 14 by a retainer or clip 165. The retainer 165 may be disengaged from the pump 102 by a user (e.g., by pivoting the retainer 165) to allow the pump 102 to be removed from the housing 14 for cleaning or maintenance purposes.

The illustrated aerator 106 provides a fluid flow path from the pump 102 to the nozzle 110 and includes an elongated mixing chamber 114, a front plug 118 disposed at a downstream end of the mixing chamber 114, and a support 122 that supports the mixing chamber 114. In some embodiments, the dispenser 10 may include a gas source (e.g., nitrogen, carbon-dioxide, air, or the like) coupled to the aerator 106. In other embodiments, the aerator 106 may be omitted, and the fluid transfer assembly 78 may include any suitable fluid pathway for transferring fluid from the pump 102 to the nozzle 110. In other embodiments, the fluid transfer assembly 78 may include multiple aerators 106.

The illustrated fluid transfer assembly 78 also includes a quick-release connection inlet 126 disposed at the inlet of the pump 102. The connection inlet 126 interfaces with an interchangeable product package 130 that contains a volume of liquid product to be dispensed. For example, the product package 130 may contain dairy or non-dairy cream, coffee, hot chocolate, tea, cheese product, or any other desired product to be dispensed. Any pumpable product can be stored in the product package 130 and dispensed by the dispenser 10.

In the embodiment illustrated in FIG. 3, the product package 130 includes a fitting 134 couplable to the connection inlet 126 to establish fluid communication between the product package 130 and the pump 102. In particular, the connection inlet 126 is sized and shaped to be insertable into the fitting 134 to establish fluid communication between the pump 102 and the interior of the product package 130 via the connection inlet 126. In some embodiments, the connection inlet 126 may include a bayonet fitting 127 (FIG. 9) that cooperates with the fitting 134 on the product package 130. Accordingly, when the product package 130 is coupled to the connection inlet 126, the pump 102 can draw the liquid product directly from the product package 130, without the product coming into contact with or being stored in any other reservoirs.

In the illustrated embodiment, the product package 130 is a flexible pouch. The pouch 130 may be made of any suitable food-safe material(s), such as polypropylene, polyethylene, or the like, and in some cases includes one or more layers of thermally-conductive materials such as metal foil. The fitting 134 on the product package 130 can include a valve (not shown), a cover, a seal, or the like that prevents the product from flowing out of the package 130 until the fitting 134 is coupled to the connection inlet 126. In some embodiments, the product package 130 is a disposable, single-use package such that the product package 130 is not intended to be refilled once its contents are dispensed by the dispenser 10. In other embodiments, the product package 130 may be a reusable, refillable package. The dispenser 10 may also be able to accept other types of product packages 130, including but not limited to cartons, aseptic brick packages, and the like.

Figure 9:
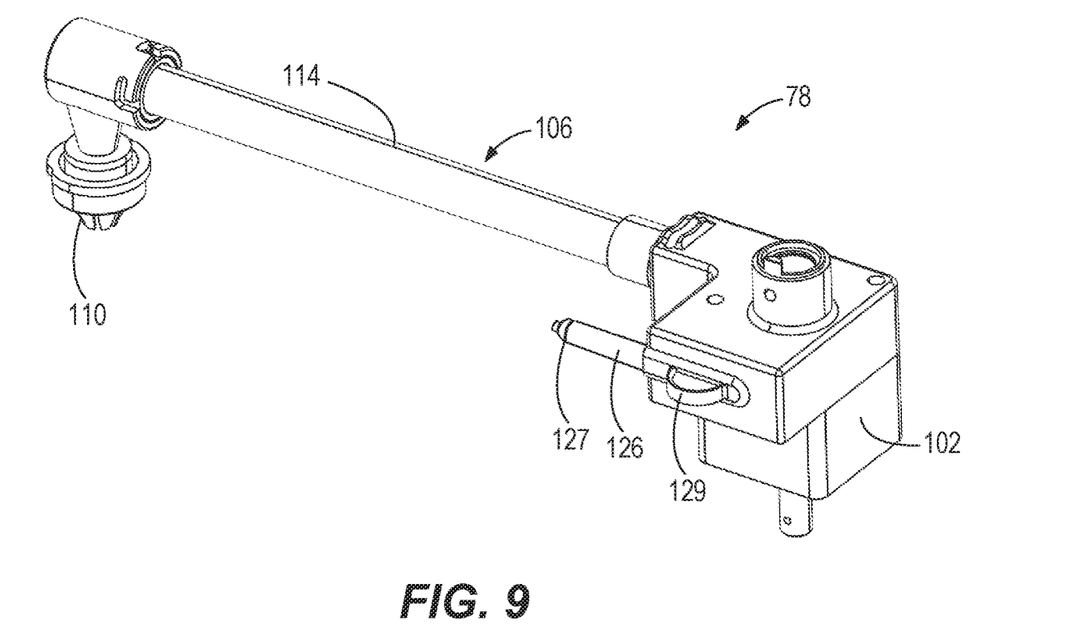
FIG. 9 is a perspective view of a fluid transfer assembly of the dispenser of FIG. 1.

Referring to FIG. 9, in the illustrated embodiment, the connection inlet 126 is removable from the pump 102, which may facilitate cleaning of the connection inlet 126 and the pump 102. For example, the connection inlet 126 may be removably coupled to the pump 102 by one or more retaining clips or other fasteners that are accessible to a user of the dispenser 10, or the connection inlet 126 may be coupled to the pump 102 via an interference fit or any other suitable connection, such as a threaded connection. In the illustrated embodiment, the connection inlet 126 includes a handle 129 to facilitate removing the connection inlet 126 from the pump 102 and/or coupling the connection inlet 126 to the pump 102.

Figure 10:
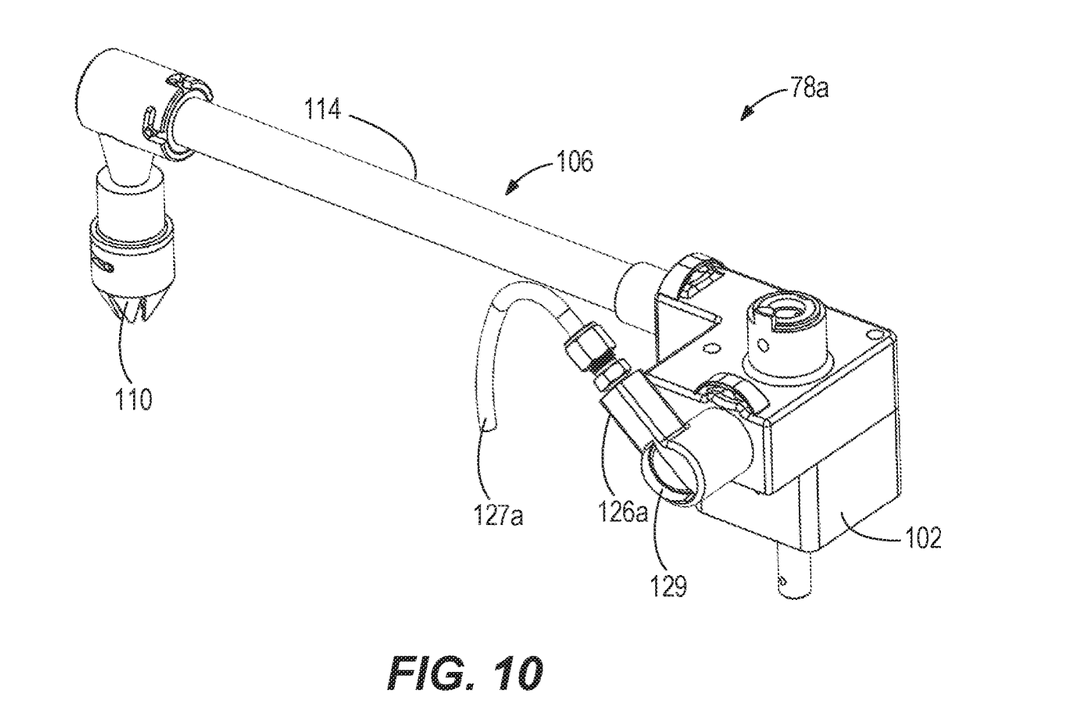
FIG. 10 is a perspective view of a fluid transfer assembly according to another embodiment usable with the dispenser of FIG. 1.

The connection inlet 126 may be interchangeable with other connection inlets, such as the connection inlet 126a illustrated in FIG. 10. This may advantageously allow the pump 102 to be coupled to a wide variety of product packages. In the illustrated embodiment, the connection inlet 126a includes a handle 129 to facilitate removing the connection inlet 126a from and/or coupling the connection inlet 126a to the pump 102. The illustrated connection inlet 126a also includes a tube 127a that is insertable into a product package, such as the product package 130 or other types of product packages. In some embodiments, the tube 127a may be configured for insertion into an aseptic brick product package (e.g., through a hole in the product package). In some embodiments, the tube 127a may be made of a flexible material to facilitate aligning and inserting the tube 127a into the product package. In some embodiments, the tube 127a may include a sharp end for piercing the product package. In other embodiments, the tube 127a may be configured to draw product out of an open reservoir.

Figure 2B:
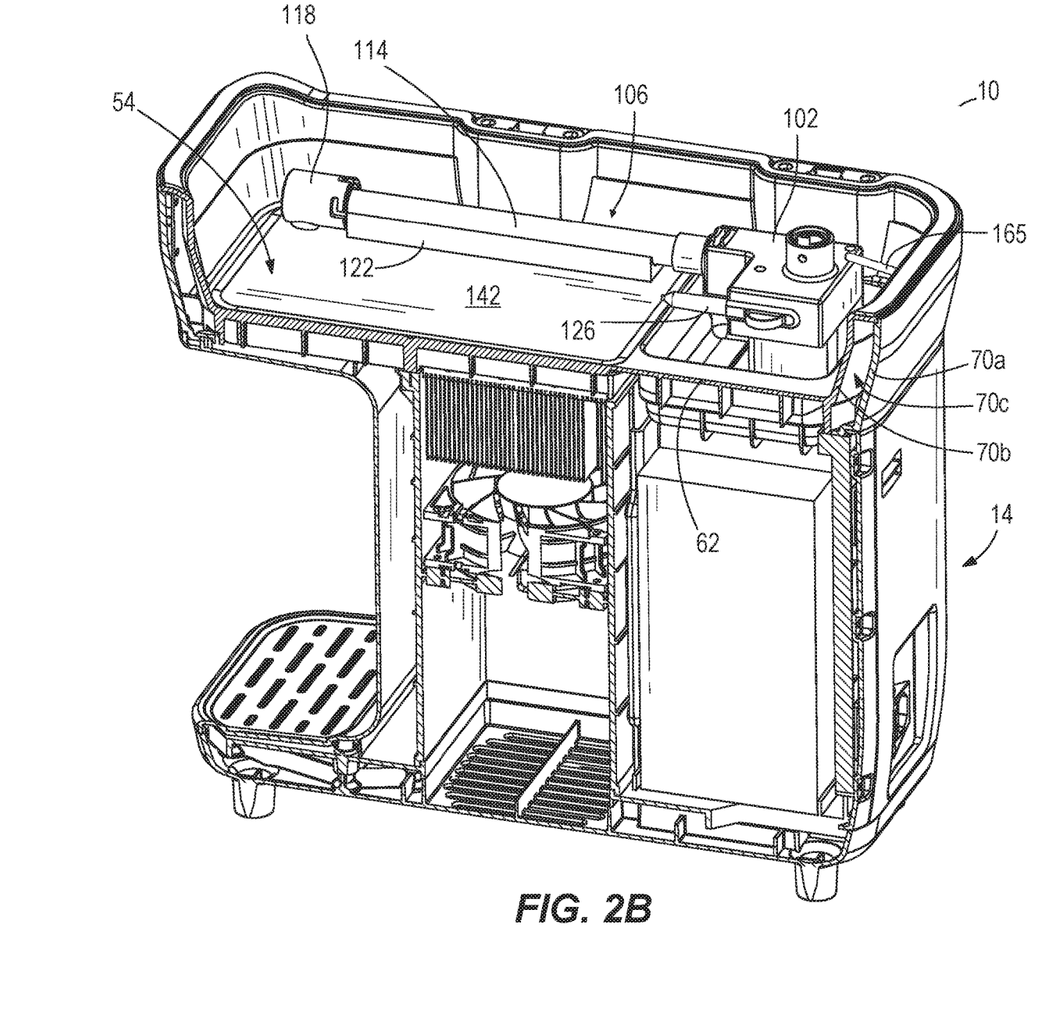
FIG. 2B is a cross-sectional view of the dispenser of FIG. 1, taken along line 2B-2B, with a lid of the dispenser omitted.

Referring to FIGS. 2B and 3, the temperature control assembly 82 will now be described. The temperature control assembly 82 is operable to regulate the temperature of upper compartment 54, the components therein, and the product package 130 when installed therein. The temperature control assembly 82 can include a thermoelectric device 138 (e.g., a Peltier device) in a heat transfer relationship with a temperature control element or thermally conductive body 142, such as a thermally conductive plate, bar, or other body. The thermoelectric device 138 may be configured to heat and/or cool the thermally-conductive body 142. In some embodiments, the thermoelectric device 138 may be replaced by any other suitable temperature control device, including but not limited to a vapor-compression cooling device, a cold and/or hot water circulation device, or the like.

In the illustrated embodiment, the body 142 is configured as a plate that extends laterally within the upper compartment 54. The thermally-conductive body 142 can be located generally proximate the bottom of the upper compartment 54 and below the components of the fluid transfer assembly 78. In other words, the thermally-conductive body 142 is disposed between the components of the fluid transfer assembly 78 and the lower compartment 58. In this regard, the thermally-conductive body 142 can be located between any or all of the mixing chamber 114, the plug 118, and the pump 102 and the bottom of the upper compartment or the lower compartment 58. In some embodiments, the thermally-conductive body 142 can also be located between the support 122 and the bottom of the upper compartment or the lower compartment 58. In some embodiments, the temperature control assembly 82 also includes a heat sink 146 below the plate 142.

A controller (e.g., a microprocessor-based controller; not shown) may be provided to control operation of the temperature control assembly 82, and one or more temperature sensors (e.g., thermistors, thermocouples, or the like; not shown) may provide feedback to the controller. In some embodiments, the thermoelectric device 138 may be operable to cool or heat the thermally-conductive body 142, depending on whether the controller applies positive or negative voltage to the thermoelectric device 138. In such embodiments, when the thermoelectric device 138 cools the thermally conductive body 142, waste heat is removed by the heat sink 146 to its surroundings, and when the thermoelectric device 138 warms the thermally conductive body 142, the heat sink 146 may draw heat from its surroundings.

In the illustrated embodiment, the entirety of the fluid transfer assembly 78 and the interchangeable product package 130 are housed within the insulated upper compartment 54. In addition, the product package 130, the aerator support 122, and the pump 86 of the illustrated embodiment are all in thermally conductive contact (e.g., direct abutting contact) with the thermally conductive body 142 of the temperature control assembly 82, although in other embodiments fewer than all of these components of the fluid transfer assembly 78 are in such thermally conductive contact with the thermally conductive body 142.

In the illustrated embodiment, the thermally conductive body 142 includes an aperture 150, and the nozzle 110 extends at least partially within or through the aperture 150 such that the nozzle 110 is in thermally conductive contact (e.g., direct abutting contact) with at least a portion of the inner wall of the aperture 150. In other embodiments, the nozzle 110 is in thermally conductive contact with one or more other surfaces of the thermally conductive body 142. Thus, the thermoelectric device 138 can transfer heat to or from the fluid transfer assembly 78 including the nozzle 110, as well as the product contained in the product package 130, by conduction. The thermoelectric device 138 may also transfer heat to or from the fluid transfer assembly 78 and product package 130 by convection, for example, by heating or cooling the air contained within the insulated upper compartment 54.

With continued reference to FIG. 3, in some embodiments, the thermoelectric device 138 includes a plurality of heating/cooling elements 139 arranged underneath the thermally-conductive body 142. Each of the heating/cooling elements 139 may provide localized heating and/or cooling to heat or cool corresponding zones of the thermally-conductive body 142 proximate the thermoelectric elements 139. In the illustrated embodiment, the thermoelectric device 138 includes three heating/cooling elements 139 arranged underneath the aerator 106, and one heating/cooling element 139 arranged underneath the body 142 where the product package 130 may be positioned on the body 142. In other embodiments, the heating/cooling elements 139 may be arranged differently, and in some embodiments, the thermoelectric device may include only a single heating/cooling element 139. In some embodiments, the body 142 may be heated or cooled as a single zone.

Although a single thermally conductive body 142 is illustrated the FIG. 3, in other embodiments the dispenser 10 can include two or more thermally conductive bodies (not shown) having the same or different shapes as that shown in FIG. 3. The thermally conductive bodies can be located one above the other to enable two or more product packages 130 to be placed in thermally-conductive contact with respective thermally conductive bodies located above and/or below the product packages (e.g., in stacked relation). Alternatively, the thermally conductive bodies can be located in side-by-side relationship for conductively cooling respective product packages 130. Any other positional relationship between two or more thermally conductive bodies (and their respective product packages 130) is possible and falls within the spirit and scope of the present invention. The use of two more thermally conductive bodies 142 in the same dispenser 10 can enable the dispenser 10 to maintain different product packages 130 (e.g., containing different food products to be dispensed) at different temperatures. For example, one thermally conductive body 142 can keep one food product package 130 cold, whereas another thermally conductive body 142 can keep another food product package 130 warm or hot. As another example, two thermally conductive bodies 142 can keep two respective food product packages at different cold temperatures.

With reference to FIG. 3, in operation, a user opens the lid 26 and connects the product package 130 to the connection inlet 126. This establishes fluid communication between the product package 130 and the pump 102. The user can then initiate a dispensing operation. The drive assembly 74 drives the pump 102, which draws product from the product package 130, and optionally draws additives such as flavors or other products from other packages, reservoirs, or the like (not shown). The product and any additives can be mixed together in the mixing chamber 114 before being dispensed through the nozzle 110. In some embodiments, gas (e.g., carbon dioxide, nitrogen, air, or the like) may be added to the product as it passes through the mixing chamber 114, and in some embodiments, the mixing chamber 114 may include flow passages and restrictions so as to provide emulsifying homogenization. In other words, liquid product drawn from the product package 130 may be whipped by the aerator 106 and expelled through the nozzle 110 as a whipped product (such as whipped cream or other whipped topping). In some embodiments, one or more liquids (including, for example, coloring or flavoring additives), may additionally or alternatively be mixed with the product as it passes through the mixing chamber 114.

The temperature control assembly 82 provides for precise temperature control of the product in the product package 130, as well as all of the downstream components of the fluid transfer assembly 78 that come into contact with the product via conduction. Such precise temperature control is particularly advantageous when the dispenser 10 is used to dispense temperature-sensitive products, such as dairy-based products.

The aerator 106 may generate heat as product is pumped through the aerator 106 at high pressures. For example, the pump 102 may have a discharge pressure at the inlet of the aerator 106 of at least 40 psi in some embodiments, between 40 psi and 200 psi in some embodiments, or between 80 psi and 160 psi in some embodiments. These high pressures may be desirable for aeration/whipping performance of the aerator 106.

Accordingly, in the illustrated embodiment, the temperature control assembly 82 may provide different temperature controlled zones. For example, a zone adjacent the aerator 106 may have a greater heating/cooling capacity than a zone adjacent the product package 130 to account for the higher heat load generated by the aerator 106. The controller may be configured to control the temperatures of these zones independently (e.g., by controlling each of the heating/cooling elements 139 independently). Because the thermoelectric device 138 in the illustrated embodiment includes a greater number of heating/cooling elements 139 adjacent the aerator 106, the illustrated temperature control assembly 82 is capable of providing greater cooling capacity to quickly and effectively remove the heat generated by the aerator 106. This may advantageously maintain the aerator 106 at food-safe temperatures during and/or after operation of the dispenser 10.

Referring to FIGS. 2B-3, the positioning of the components of the fluid transfer assembly 78 in the upper compartment 54 also facilitates access to these components for easy cleaning (i.e. by simply opening the lid 26). Cleaning is also made more efficient and convenient by the use of the interchangeable product package 130 (FIG. 3). When the product is depleted, the existing product package 130 can be disconnected from the inlet 126 and quickly replaced with a new product package 130, without having to clean out any reservoirs. In addition, enhanced access to the components of the fluid transfer assembly 78 enables the user in some cases to remove the pump 102, mixing chamber 114, plug 118, nozzle 110, and or the support 122 from the dispenser 10 by simply disconnecting the nozzle 110 from the front plug 118 of the aerator 106 and disconnecting an input shaft 163 of the pump 102 from the drive shaft 98. In some embodiments, quick connect interfaces may be provided between the nozzle 110 and front plug 118, and/or between the input shaft 163 and the drive shaft 98. This ease of removal and replacement enables the user to clean any or all of these components either in place or outside of the dispenser 10, such as in a cleaning area (e.g., a sink), a dishwasher, or other cleaning machines.

For example, in some embodiments, the present disclosure may provide a method of disassembling the dispenser 10 (e.g., for cleaning or maintenance purposes) that may include (a) opening the lid 26 to access the upper compartment 54, (b) detaching the dispensing nozzle 110 from the aerator 106, (c) disengaging the retainer 165 from the pump 102, and (d) removing the pump 102 and the aerator 106 from the upper compartment 54. In some embodiments, the pump 102 and the aerator 106 may be removable together from the upper compartment 54 as an assembly.

Finally, the vertically stacked arrangement of the motor 86, heat sink 146, thermally-conductive body 142, product package 130, and fluid transfer assembly 78 allows the thermally conductive body 142 and the dividing walls 62 to spatially separate the heat-producing components (i.e. the motor 86 and the heat sink 146) from the temperature-controlled components in the upper compartment 54 in a direction along the axis 94. Also, this vertically stacked arrangement generates significant space savings for the dispenser 10. For example, by virtue of the pump 102, mixing chamber 114, and/or plug 118 being located in a common plane and/or vertically over the thermally conductive body 142, which itself is located in a plane that is vertically disposed from the motor 86, the dispenser 10 has a compact and efficient design. This efficiency is further enhanced by the product package 130 being located in a plane that is vertically disposed from the plane of the thermally conductive body 142, and the plane of the pump 102, mixing chamber 114, and/or plug 118. Such space efficiency also reduces the energy necessary to maintain the components and product package(s) 130 at desired temperatures that are different from the ambient temperature.

In some embodiments, to clean the dispenser 10, a package of cleaning solution with the same type of fitting 134 as the product package 130 can be coupled to the connection inlet 126. The dispenser 10 can then be run in an automated cleaning cycle, in which cleaning solution is pumped out of the package and through the fluid transfer assembly 78. To enhance cleaning and sanitizing, the temperature control assembly 82 may operate to heat the thermally conductive body 142, thereby heating the cleaning solution and the fluid transfer assembly 78 by conduction.

Various features of the invention are set forth in the following claims.

What is claimed is:

1. A dispenser configured to dispense a product from a product package, the dispenser comprising:
    an inlet configured to receive the product from the product package;
    a dispensing nozzle downstream of the inlet;
    a pump in fluid communication with the inlet and operable to pump the product from the product package to the dispensing nozzle;
    a fluid pathway extending between the pump and the dispensing nozzle, the fluid pathway including an aerator configured to whip the product as the product flows along the aerator; and
    a temperature control assembly including a temperature control element in thermally conductive contact with the product package, the fluid pathway, and the dispensing nozzle to heat or cool the product package, the fluid pathway, and the dispensing nozzle,
    wherein the temperature control element includes a thermally conductive plate defining an aperture, and
    wherein the dispensing nozzle extends through the aperture.

2. The dispenser of claim 1, wherein the plate is configured to at least partially support the product package.

3. The dispenser of any of claims 1, wherein the temperature control assembly includes a thermoelectric device configured to heat or cool the temperature control element.

4. The dispenser of claim 1, wherein the temperature control element includes a first zone and a second zone, and wherein the temperature control assembly is configured to control a temperature of the first zone and a temperature of the second zone independently.

5. The dispenser of claim 4, wherein the first zone is located adjacent the fluid pathway, and the second zone is located adjacent the product package such that the temperature control assembly is configured to control a temperature of the fluid pathway and a temperature of the product package independently.

6. The dispenser of claim 5, wherein the first zone has a greater heating or cooling capacity than the second zone.

7. The dispenser of claim 1, wherein the pump includes an outlet in fluid communication with the fluid pathway, and wherein the pump is configured to discharge the product from the outlet at a discharge pressure of at least 40 psi.

8. The dispenser of claim 1, further comprising a motor configured to drive the pump; and a wall separating the pump and the motor,
    wherein the motor includes a motor shaft,
    wherein the pump includes a pump shaft,
    wherein the pump shaft is removably coupled to the motor shaft, and
    wherein at least one of the pump shaft or the motor shaft extends through the wall.

9. The dispenser of claim 8, further comprising a housing including a first compartment and a second compartment, wherein the pump is supported within the first compartment, wherein the motor is supported within the second compartment, and wherein the first compartment is configured to receive the product package.

10. The dispenser of any of claim 1, wherein the inlet is insertable into the product package, and wherein the inlet is removably coupled to the pump.

11. The dispenser of claim 1, wherein the product includes cream, and wherein the dispenser is operable to dispense whipped cream from the dispensing nozzle.

12. The dispenser of claim 1, wherein the dispensing nozzle is in direct contact with an inner wall of the aperture.

13. The dispenser of claim 1, wherein the aerator includes an elongated mixing chamber.

14. A dispenser configured to dispense a product from a product package, the dispenser comprising:
    a housing including a first compartment configured to receive the product package and a second compartment separated from the first compartment;
    a motor positioned in the second compartment, the motor including an output shaft defining an axis;
    an inlet configured to receive the product from the product package;
    a dispensing nozzle downstream of the inlet;
    a pump positioned in the first compartment, the pump in fluid communication with the inlet and driven by the output shaft to pump the product from the product package to the dispensing nozzle;
    a fluid pathway extending between the pump and the dispensing nozzle, the fluid pathway including an aerator configured to whip the product as the product flows along the aerator; and
    a temperature control assembly in thermally conductive contact with the product package, the fluid pathway, and the dispensing nozzle to heat or cool the product package, the fluid pathway, and the dispensing nozzle,
    wherein the temperature control assembly includes a thermally conductive plate defining an aperture, and
    wherein the dispensing nozzle extends through the aperture.

15. The dispenser of claim 14, wherein the plate is configured to at least partially support the product package within the first compartment.

16. The dispenser of claim 14, wherein the fluid pathway is disposed entirely within the first compartment.

17. A dispenser configured to dispense a product from a product package, the dispenser comprising:
    an inlet configured to receive the product from the product package;
    a dispensing nozzle downstream of the inlet;
    a pump in fluid communication with the inlet and operable to pump the product from the product package to the dispensing nozzle through a fluid flow path, the fluid flow path including an aerator configured to whip the product as the product flows along the aerator; and a temperature control assembly in thermally conductive contact with the product package, the fluid flow path, and the dispensing nozzle to heat or cool the product package, the fluid flow path, and the dispensing nozzle, the temperature control assembly including a first zone configured to heat or cool the fluid flow path and a second zone configured to heat or cool the product package, wherein the second zone has a greater heating or cooling capacity than the first zone, wherein the temperature control assembly includes a thermally conductive plate defining an aperture, and wherein the dispensing nozzle extends through the aperture.

* * * * *

UNITED STATES PATENT AND TRADEMARK OFFICE
CERTIFICATE OF CORRECTION

| | | |
|---|---|---|
| PATENT NO. | : 12,336,656 B2 | Page 1 of 1 |
| APPLICATION NO. | : 17/285047 | |
| DATED | : June 24, 2025 | |
| INVENTOR(S) | : Shawn Campbell et al. | |

It is certified that error appears in the above-identified patent and that said Letters Patent is hereby corrected as shown below:

In the Claims

Column 9, Claim 3, Line 50:
Replace "any of claims" with --claim--

Column 10, Claim 10, Line 19:
Delete "any of"

Signed and Sealed this
Eleventh Day of November, 2025

John A. Squires
*Director of the United States Patent and Trademark Office*